United States Patent
Shmukler et al.

(10) Patent No.: US 12,197,483 B1
(45) Date of Patent: Jan. 14, 2025

(54) ENTERPRISE-LEVEL CLASSIFICATION OF DATA-ITEMS IN AN ENTERPRISE REPOSITORY AND PREVENTION OF LEAKAGE OF PERSONALLY IDENTIFIABLE INFORMATION (PII)

(71) Applicant: VARONIS SYSTEMS, INC., New York, NY (US)

(72) Inventors: Peter Shmukler, Netanya (IL); Amit Cohen, Kfar Saba (IL); Lior Chen, Tel Mond (IL); Nir Zinger, Moshav Burgata (IL)

(73) Assignee: VARONIS SYSTEMS, INC., New York, NY (US)

( * ) Notice: Subject to any disclaimer, the term of this patent is extended or adjusted under 35 U.S.C. 154(b) by 0 days.

(21) Appl. No.: 18/385,930

(22) Filed: Nov. 1, 2023

(51) Int. Cl.
| | |
|---|---|
| *G06F 16/00* | (2019.01) |
| *G06F 16/35* | (2019.01) |
| *G06F 21/62* | (2013.01) |
| *G06F 40/284* | (2020.01) |
| *G06F 40/40* | (2020.01) |

(52) U.S. Cl.
CPC .......... *G06F 16/35* (2019.01); *G06F 21/6245* (2013.01); *G06F 40/284* (2020.01); *G06F 40/40* (2020.01)

(58) Field of Classification Search
CPC .... G06F 16/35; G06F 21/6245; G06F 40/284; G06F 40/40
See application file for complete search history.

(56) References Cited

U.S. PATENT DOCUMENTS

| | | | |
|---|---|---|---|
| 10,891,338 B1 * | 1/2021 | Mark | G06F 16/93 |
| 11,270,213 B2 * | 3/2022 | Neelamana | G06N 5/022 |
| 11,615,361 B2 * | 3/2023 | Nag | G06Q 10/0635 705/7.28 |
| 11,755,848 B1 * | 9/2023 | Dan | G06N 20/00 704/270.1 |
| 11,870,757 B1 * | 1/2024 | Mehta | H04L 9/3213 |
| 12,105,729 B1 * | 10/2024 | Haq | G06F 16/93 |
| 12,124,592 B1 * | 10/2024 | O'Hern | G06N 20/00 |
| 12,141,326 B1 * | 11/2024 | Barouch | G06F 21/31 |
| 12,142,371 B1 * | 11/2024 | Shah | G16H 40/20 |
| 12,143,368 B2 * | 11/2024 | Mehta | H04L 9/3213 |
| 2007/0244867 A1 * | 10/2007 | Malandain | G06F 16/313 707/E17.084 |
| 2011/0022605 A1 * | 1/2011 | Acharya | G06Q 30/0246 707/748 |

(Continued)

*Primary Examiner* — Noosha Arjomandi
(74) *Attorney, Agent, or Firm* — AlphaPatent Associates Ltd.; Daniel J. Swirsky

(57) ABSTRACT

Device, system, and method for automatically detecting and classifying personally identifiable information (PII) in documents and files. A method includes performing a deterministic rule-based search, in a plurality of stored documents, for PII data-items. If the deterministic rule-based search indicates that a particular document is more likely than not to contain a PII data-items then the method includes: extracting a textual snippet from the particular document, wherein the textual snippets surrounds the PII data-item; adding the textual snippet and the particular document to one or more training datasets utilized for training a Large Language Model (LLM) configured to find PII data-items in documents for Named Entity Recognition (NER) in those documents.

20 Claims, 6 Drawing Sheets

(56) References Cited

U.S. PATENT DOCUMENTS

| | | | |
|---|---|---|---|
| 2021/0004485 A1* | 1/2021 | Summers | G06F 40/284 |
| 2021/0400076 A1* | 12/2021 | Shivanna | G06N 5/022 |
| 2022/0108126 A1* | 4/2022 | Schieber | G06N 20/00 |
| 2022/0129583 A1* | 4/2022 | Balasubramanian | G06F 21/6254 |
| 2022/0309037 A1* | 9/2022 | Gutierrez | G06F 16/16 |
| 2022/0374602 A1* | 11/2022 | Park | G06F 40/295 |
| 2023/0161903 A1* | 5/2023 | Kopylov | G06F 21/6245 726/26 |
| 2023/0396635 A1* | 12/2023 | Hebbagodi | H04L 63/1425 |
| 2024/0095467 A1* | 3/2024 | Lin | G06F 40/49 |
| 2024/0144141 A1* | 5/2024 | Cella | G06Q 30/0206 |
| 2024/0331815 A1* | 10/2024 | Kim | G06F 40/295 |
| 2024/0378425 A1* | 11/2024 | Bodigutla | G06N 3/0455 |

\* cited by examiner

O  B-date
Date: 28.05.1995

O  B-Org  I-Org  I-Org  I-Org
To: Ministry of Interior Affairs

O    O
Undertaking Letter

O O O B-Per I-Per O B-Country O  O  O  O  B-Passport Number O  O  O

Dear Sir, I John Smith, US citizen and holder of passport number C123456789, agree to provide a O    O    O  B-City I-City  O    O    O    O    O    O    O    O    B-Country tenancy contract attested by the Abu Dhabi Government on the due date of my dependents UAE O    O    O
residence visa renewal.

○   B-date

Date: 28.05.2005

○   B-Org I-Org I-Org

To:  Ministry of Interior Affairs

○
Letter

○   ○   ○   B-Per  I-Per   ○   ○   B-Country   ○   ○   ○   ○   B-Passport Number   ○   ○   ○   ○

Dear Sir, I Sara Cohen, citizen of Israel and holder of passport 987654321, agree to provide a ○   ○   ○   ○   B-City  I-City   ○   ○   ○   ○   ○   ○   ○   ○   ○   ○   ○   B-Country tenancy contract attested by the Abu Dhabi Government on the due date of my dependents UAE

○   ○   ○ residence visa renewal.

ENTERPRISE-LEVEL CLASSIFICATION OF DATA-ITEMS IN AN ENTERPRISE REPOSITORY AND PREVENTION OF LEAKAGE OF PERSONALLY IDENTIFIABLE INFORMATION (PII)

FIELD

Some embodiments are related to the field of computerized systems.

BACKGROUND

Corporations, organizations, and other entities typically store numerous files and documents that pertain to their business, their products, their assets, their customers, their employees, or the like. Some organizations store millions of such files and documents. Storage may be performed locally on a server or data repository located on-premises, or remotely on a server or data repository located remotely or at a cloud-computing provider.

SUMMARY

Some embodiments include systems, devices, and methods for automatically detecting, identifying, classifying, and/or tagging Personally Identifiable Information (PII), particularly within a large number of files or documents that are digitally stored in a data repository.

For example, a method includes performing a deterministic rule-based search, in a plurality of stored documents, for PII data-items. If the deterministic rule-based search indicates that a particular document is more likely than not to contain a PII data-items then the method includes: extracting a textual snippet from the particular document, wherein the textual snippets surrounds the PII data-item; adding the textual snippet and the particular document to one or more training datasets utilized for training a Large Language Model (LLM) configured to find PII data-items in documents for Named Entity Recognition (NER) in those documents.

Some embodiments may provide other and/or additional benefits and/or advantages.

BRIEF DESCRIPTION OF THE DRAWINGS

FIG. 1A is an illustration of a text-portion that can be used for training purposes, in accordance with some demonstrative embodiments.

FIG. 1B is an illustration of another text-portion, that can be correctly analyzed and processed by some demonstrative embodiments.

DETAILED DESCRIPTION OF SOME DEMONSTRATIVE EMBODIMENTS

Figure 2A:
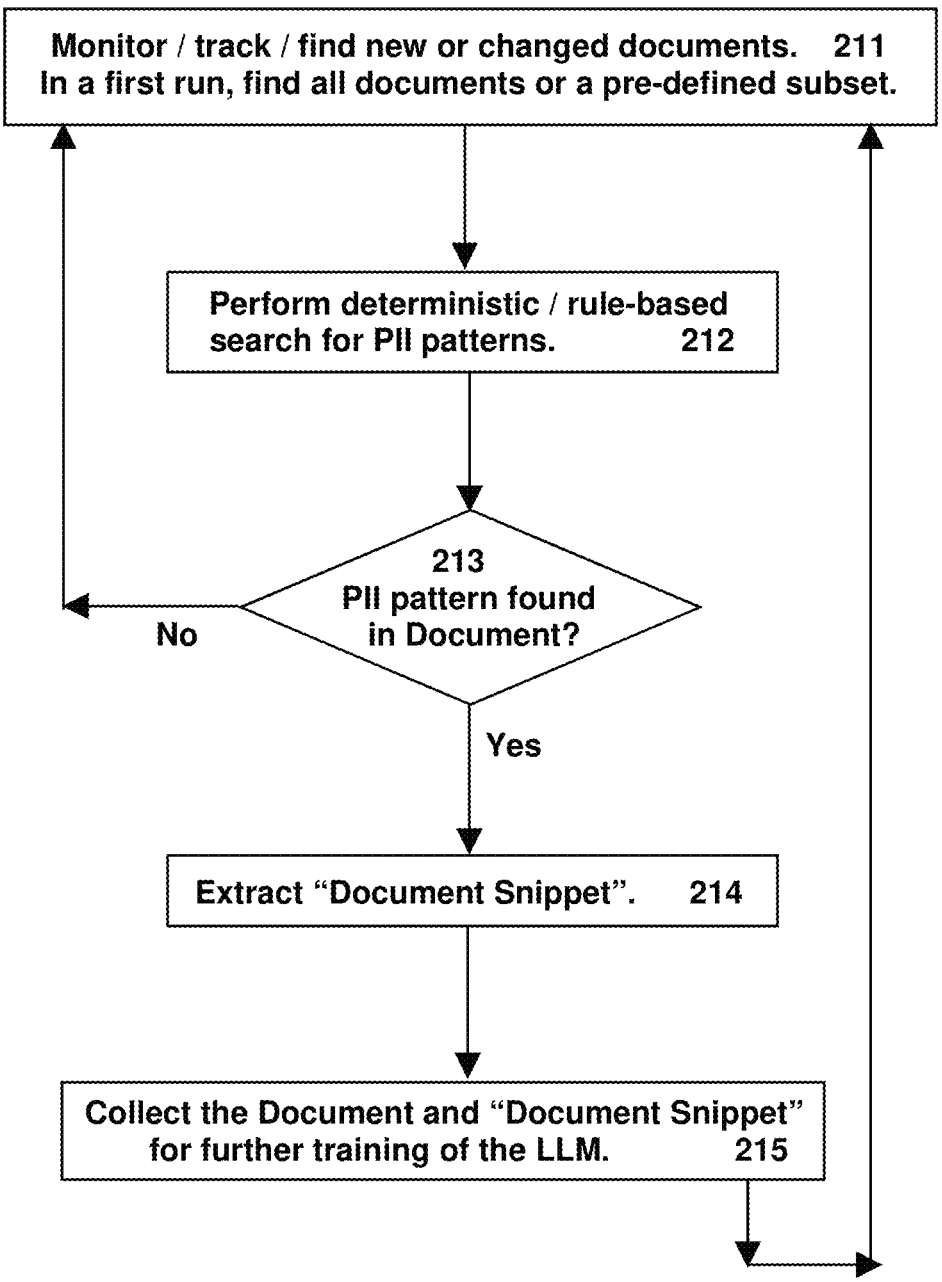
FIG. 2A is a flow-chart demonstrating a first stage in a three-stage method, in accordance with some demonstrative embodiments.

The terms "Personally Identifiable Information" or "PII" include a data-item that, when used by itself or in combination with one or more other data-item(s), can identify an individual (e.g., precisely, or accurately, or at a reasonable level of accuracy or certainty). For example, PII may include: a person's full name (first name and family name); a person's home address; a person's Social Security Number (SSN); a person's national or state-issued or government-issued ID card number; a person's driver license number or driver permit number; a person's date-of-birth; or the like.

The term "Protected Entity", or similar terms such as "Protected Organization" or "Protected Enterprise", as used herein, includes an entity/organization/enterprise that stores documents/files data, in a local (client-side/on-site/on-premises) data repository and/or in a remote or cloud-computing repository or data-center, and whose documents/files/data are protected by the system of the present invention against PII data leakage and/or against PII exposure to the public and/or against PII comprise by attackers and/or against mis-handling of PII-containing documents or files.

The Applicant has realized that detecting, securing and/or handling PII may be an important or even a crucial task for almost any business, entity, corporation or organization. For example, some entities may be subject to specific laws and regulations, and/or to contractual obligations, that define strict or particular obligations with regard to storing and/or handling PII; for example, the General Data Protection Regulation (GDPR) regulates information privacy in the European Union (EU); the Health Insurance Portability and Accountability Act (HIPAA) regulates the privacy of information maintained by healthcare providers and health insurance providers in the United States; the Sarbanes-Oxley (SOX) Act sets data protection requirements that are applicable to certain public companies and accounting firms; the California Consumer Privacy Act (CCPA) and the California Privacy Rights Act (CPRA) provide certain privacy rights to California consumers; or the like. In various situations, an entity that stores documents, files and/or other data, may be required to dynamically know which particular documents or files contain PII, as such documents or files may be subject to particular legal requirements and/or contractual obligations.

Additionally or alternatively, some entities may need, or may desire, to know which particular documents or files contain PII, for security reasons. For example, a company may select to store documents that contain PII in a first repository or server, associated with a first set of access privileges or access restrictions or security measures; whereas, that same company may select documents that do not contain PII in a second repository or server, associated with a second (and different) set of access privileges or access restrictions or security measures.

The Applicant has realized that some conventional systems attempt to detect PII in documents, by using Regular Expression (RegEx) tools. Indeed, some RegEx tools may sometimes detect a particular type of PII, such as SSN or credit card number, which conform to a particular string-length and contain only digits. However, realized the Applicant, conventional RegEx tools often fail to detect a variety of other types of PII; for example, passport numbers or driver license numbers of various countries, which are often a string that includes a particular combination of letters and digits, and that may vary based on the relevant country.

Additionally or alternatively, realized the Applicant, some conventional RegEx tools fail to detect particular PII items due to an incorrect or an ambiguous Optical Character Recognition (OCR) process that was applied to a document, which failed to correctly distinguish between the digit zero (0) and the letter O as in Oscar, or which failed to correctly distinguish between the digit one (1) and the letter I as in India (e.g., if written in a particular font, such as Arial). For example, realized the Applicant, a scanned document that contains a SSN with the digits 1 and 0, may be subject to an OCR process that incorrectly recognizes those digits as "I" and "O" respectively, thereby causing a conventional RegEx tool to fail in detecting a SSN there. Similarly, an OCR process may mistakenly recognize a printed "0" digit as a printed "O" letter, and may thus cause failure of a conventional RegEx tool to detect a credit card number. Additionally or alternatively, a conventional RegEx tool may fail to detect that a misspelled name or a misspelled address are PII data-items.

The Applicant has further realized that Named Entity Recognition (NER) is an important aspect of Natural Language Processing (NLP). For example, a NER process receives a text and attempts to identify extracting names of individuals, names of organizations, locations (e.g., street address), expressions of time (e.g., calendar date), quantities, monetary values, percentages, or the like.

The Applicant has realized that one or more features or operations or capabilities of a NER process/unit/module, may be operably combined with one or more features or operations or capabilities of a Large Language Models (LLM) engine or unit, such as GPT-3.5 or GPT-4 (or future versions thereof) from OpenAI, BERT from Google, Llama or Llama-2 (or future versions thereof) from Meta, or other LLM engines (e.g., Alpaca, Vicuna), in order to innovatively improve the analysis of textual data (or, of documents or files that include text-portions), and/or to improve the capability to automatically and correctly recognize/detect/find/classify PII data-items, and/or to improve the accuracy and/or efficiency of such PII data-items recognition or detection, and/or to achieve human-level performance (HLP) or near-HLP in such recognition or detection.

Some embodiments may perform a deterministic search in a corpus (or repository) of documents or files of a particular entity or organization; and may utilize the search results to perform automatic labeling of documents and/or data-items in a supervised learning approach that enables a LLM engine to accurately and efficiently extract named PII data-items.

For example, an organization may have a corpus of documents (e.g., of a law firm, or a banking institution, of a government agency), many of which contain United States passport numbers, which are PII data-items. Firstly, a RegEx tool may be applied to each document; and the RegEx outputs/results/findings may be utilized to fine-tune or configure the LLM of an LLM engine with the NER tag "passport number" (in this example). Then, the fine-tuned LLM may be used to find and detect passport numbers in other documents (e.g., of that corpus of documents of that same organization or entity) with any passport number format in a similar context. Some tags, such as Person, Organization, and Country, can be pre-trained; whereas some tags, such as Passport Number, can be customized or configured by an administrator of the organization/entity.

Reference is made to FIG. 1A, which is an illustration of a text-portion 101 that can be used for training purposes, in accordance with some demonstrative embodiments. For example, a custom RegEx process identifies in text-portion 101 a United States passport number, in accordance with a pre-defined/standard string format (e.g., a single capital letter, followed by nine digits). This label, shown as red tag, is then used to train the LLM.

Reference is made to FIG. 1B, which is an illustration of another text-portion 102, that can be correctly analyzed and processed by some demonstrative embodiments. Text-portion 102 includes some textual strings that are generally similar to some corresponding textual strings in text-portion 101; however, text-portion 102 does not include a passport number string in the United States standard format, but rather, includes a passport number string in accordance with a different format (e.g., of the State of Israel in this example). A conventional RegEx tool may fail to recognize that the non-U.S. passport number in text-portion 102 is a passport number, and may thus suffer from a "false negative" error. However, in view of the training learned from text-portion 101, some embodiments of the present invention may correctly recognize and classify the non-U.S. passport number in text-portion 102 as a passport number and thus as a PII data-item. With approximately 183 different passport-issuing governments today, and with passport number formats being dynamically updated by governments (e.g., switching from older passports, to machine-readable passports, to biometric passports), conventional RegEx tools cannot efficiently and/or accurately detect passport number strings in all situations. Similar changes occur with regard to other PII data-items, such as credit card numbers and designs, which again render conventional RegEx tools inefficient and error-prone.

In accordance with some embodiments, by augmenting the PII detection process with LLM-based analysis of text-portion, the NER process avoids/prevents/does not require cration of numerous different RegEx rules for different document standards and PII formats; and rather, and the NER process searches for PII data-items by taking into account the textual context and/or contextual insights as generated by the LLM engine. This combined approach, of a NER process coupled with LLM engine, increases the accuracy and/or efficiency of the classification process, and/or enables accurate and efficient detection of PII data-items that typically remain undetected via conventional RegEx tools. Moreover, the combined approach of a NER process coupled with LLM engine, may accurately and efficiently detect a PII data-item even if it does not conform to any currently-known standard or rule or format, or even if it follows a brand-new standard or format that was just now established (e.g., a brand-new passport number format that a particular government has just implemented); since the contextual analysis and insights by the LLM engine may still enable the NER process to correctly identify such PII data-items.

Indeed, some evaluation operations that utilize an LLM may have increased computational requirements, compared to a single deterministic scan or classification. In order to mitigate or reduce the resource consumption, some embodiments may be configured to perform an initial Machine Language (ML) classification (e.g., by using Naive Bayes, Random Forest, Logistic Regression, Support Vector Machine (SVM), Gradient-Boosted Decision Tree (GBDT), Extreme Gradient Boosting such as XGBoost, and/or other methods) of each document beforehand; if a document is initially classified as "non-sensitive" (e.g., a document having marketing materials or product description that also appear on a public website of the entity) then the system may ignore or skip further LLM-based processing of that document; whereas, in contrast, if a document is initially classified as "sensitive" (e.g., the document is titled "Mortgage Application" or "New Patient Intake Form", then the document is processed via LLM-based processing. In some embodiments, the system may be configured to allocate a greater priority to documents that are publicly accessible, such that this type of documents would undergo the LLM-based processing for PII detection, as this type of documents are associated with a greater risk or exposure (e.g., the existence of PII in a publicly-accessible document, may cause a greater harm than the existence of PII in a not-publicly-accessible document that can be accessed only by few users and only from within the organizational network).

In accordance with some embodiments, a fine-tuning stage or process may be used; for example, utilizing user feedback indicating "false positive" errors in the training set (e.g., manual input from a user indicating that a particular documents or text-region, that was classified as containing PII, actually does not contain PII), optionally combined with manual labeling and/or neutral labeling. This may reduce the "false positive" errors in automatic classification. Additionally or alternatively, optimization parameters may be configured or adjusted (e.g., of the LLM and/or an associated optimizer unit) to account or compensate for a relatively small number of feedback samples.

In some embodiments, optionally, the sensitivity of the LLM engine or the detection process may be adjusted or configured to comply with one or more pre-defined threshold values or range-of-values for "false negative" errors (the process mistakenly determined that PII is not present, whereas the ground truth is that PII is present) and/or for "false positive" errors (the process mistakenly determined that PII is present, whereas the ground truth is that PII is not present). For example, some implementations may reflect an approach of "we prefer to produce more false positive errors, as long as we minimize to almost-zero the number of false negative errors"; and accordingly, the system may be configured to classify a document (or a document-portion, or a text-portion) as "not containing any PII" only if the system has at least M percent of certainty for this classification, wherein M is (for example) at least 95 or 97 or 99 percent; whereas, the same system may be configured to classify a document (or a document-portion, or a text-portion) as "containing at least one PII data-item" if the system has at least M percent of certainty for this classification, wherein M is (for example) at least 51 or 67 or 75 percent. Conversely, for example, some other implementations may reflect an approach of "we prefer to produce more fewer false positive errors, even if we have many false negative errors"; and accordingly, the system may be configured to classify a document (or a document-portion, or a text-portion) as "not containing any PII" if the system has at least N percent of certainty for this classification, wherein N is (for example) at least 51 or 67 or 75 percent; whereas, the same system may be configured to classify a document (or a document-portion, or a text-portion) as "containing at least one PII data-item" if the system has at least N percent of certainty for this classification, wherein M is (for example) at least 90 or 95 or 98 percent. Other suitable threshold values or ranges-of-values may be configured, to meet a desired rate of "false negative" errors and/or "false positive" errors and/or "any type of errors" for a given repository or corpus of documents or files.

The Applicant has realized that some entities are especially concerned about possible data leakage, namely, possible leakage of PII data-items to the public Internet or to other publicly-accessible files or documents; or that if an application or module needs to download or retrieve data for scanning, then such application or module and/or the associated documents that it retrieved may be compromised by attackers. To address this issue, some embodiments provide or utilize a "Local Collector" unit or module; for example, implemented as a component that is installed in or at the data-center or the repository of the entity itself, or implemented as a co-located unit in a cloud-computing system that the entity utilizes for document storage. The Local Collector unit or module enables "local" scanning of the data and documents (namely, the scanning is performed on-site/on-premises at the data-center/data repository of the entity itself; or, the scanning is performed locally in the same cloud-computing chain or platform where the data is also stored). The Local Collector unit or module returns or outputs or transmits or sends only the tags/labels/classification results/classification metadata to a central server; thus ensuring that the data itself (namely, the actual documents/files that were scanned or searched) remains securely stored at that data repository or data-center and is not transmitted or sent to any remote server or to any server that is not under the direct control and/or ownership of that entity. Some embodiments may utilize Federated Learning to send or to transmit a pre-trained model to the Local Collector unit or model; which may be trained or pre-trained or re-trained (e.g., periodically) on the documents of the entity's data-center or data repository. The Local Collector unit or model may then return or send or upload to the central server an updated version of the model, for merging with the one or more model(s) that were already constructed and/or that were received from other collectors and/or that were already updated based on updates from other collectors.

In some embodiments, a tri-stage or a three-stage process may be performed. For example, firstly, the system performs an initial deterministic search for PII data-items in documents, based on pre-defined deterministic search rules and/or dictionary words and/or keywords and/or other Regular Expression (RegEx) rules or definitions or pre-defined patterns, and/or by utilizing one or more dictionary files that correspond to vocabulary of a natural language, and/or by utilizing one or more pre-defined lists or datasets of common first names and/or family names, and/or by utilizing one or more pre-defined lists or datasets of strings that are commonly indicators of PII or that are often followed by a PII data-item (e.g., the string "Social Security Number", or the string "SSN", or the string "Date of Birth", or the string "DOB", or the string "Credit Card Number", or the like). Secondly, a particular model of an LLM engine is trained, based on the particular body of knowledge/corpus of documents of the particular Protected Entity whose documents are being protected. Thirdly, an additional search or classification is performed with regard to recently-modified documents (e.g., documents that were modified/re-saved since their most-recent search for PII). In accordance with some embodiments, document prioritization is applied; such that the system does not run an LLM-based analysis (which is computationally intensive) blindly or agnostically on every document; but rather, the LLM-based analysis is applied in a selective manner, only towards documents that were pre-classified or pre-estimated or pre-evaluated (e.g., based on rule-based analysis of document content and/or document meta-data) as being more likely to contain PII; and more particularly, the LLM-based analysis is selectively applied only to those documents that were pre-evaluated as being more likely to contain PII and that were also pre-evaluated to be publicly accessible or publicly available (and thus may create a greater risk of PII leakage, if they indeed contain PII data-items).

Reference is made to FIG. 2A, which is a flow-chart demonstrating a first stage in a three-stage method, in accordance with some demonstrative embodiments. In this stage, the system performs an initial deterministic search for PII data-items in documents, based on pre-defined deterministic search rules and/or dictionary words and/or keywords and/or other Regular Expression (RegEx) rules or definitions or pre-defined patterns.

For example, as indicated in block 211, the system performs ongoing/continuous tracking or monitoring of a data repository or a data-center of a Protected Entity to find and/or retrieve objects (e.g., documents/files) that should be searched and/or analyzed for PII. The tracking and monitoring may be performed continuously or substantially continuously, and/or at pre-defined time intervals (e.g., every minute/hour/day). Additionally or alternatively, the tracking and monitoring may be augmented by one or more pre-defined triggering events; for example, a rule that indicates that any "save" operation or "commit" operation or "upload" operation or "copy" operation or "import" operation, that introduces a new file into the data repository of the Protected Entity and/or that modifies an already-existing file, triggers a search of such newly-introduced/newly-modified object for PII. In some embodiments, in a first-ever/initial iteration or "run", the entirety of the corpus of data of the Protected Entity is searched for PII; or, a particular set of folders or drives (physical drives and/or virtual drives) or storage units are searched for PII, as selected or defined by an administrator of the Protected Entity; for example, defining or selecting that only DOC or DOCX or PDF files would be searched for PII; or, defining or selecting that only files located on "Gamma" server and not on "Delta" server would be searched for PII; or defining or selecting that only files located in "Financial-Data" folder, and not in "Draft-Images", would be searched for PII.

As indicated in block 212, each document/file/object in that corpus of objects to be searched, is indeed searched for PII, using initial deterministic search rules and/or dictionary words and/or keywords and/or other Regular Expression (RegEx) rules or definitions or pre-defined patterns. For example, a deterministic search rule may search for the string "social security number" or the string "SSN", optionally followed by a Space, and then followed by a string of 9 digits in the format of "xxx-xx-xxxx" or in the format of "xxxxxxxxx"; and may determine that such document or object contains a PII data-item of a social security number of an individual.

As indicated in block 213, if a matching pattern is not found (arrow "no"), then the method continues with the operations of blocks 211 and 213; namely, continuously or periodically tracking the introduction of new objects or modified objects (block 211) and then performing the deterministic search on such objects (block 212).

Conversely, if a matching pattern is found (block 213, arrow "yes"), then the method proceeds to perform the operations of blocks 214 and 215, and then returns to continuously track for newly-introduced/recently-modified objects (block 211).

As indicated in block 214, upon finding a PII data-item in a document or object, the method extracts a Document Snippet that contains the detected PII data-item; the Document Snippet has a particular pre-defined length (e.g., exactly 80 characters, or exactly N characters, surrounding the detected PII data-item), or has a length within a pre-defined range of length values (e.g., between M and N characters in total, surrounding the PII data-item; such as, between 40 to 90 characters); and/or such that the Document Snippet contains exactly (or approximately) one single sentence that surrounds the PII data-item (e.g., by detecting the previous and the next Period characters); and/or such that the Document Snippet contains exactly (or approximately) one single paragraph that surrounds the PII data-item (e.g., by detecting the previous and the next New Line or Line Break or Paragraph Break); and/or a Document Snippet length that has a particular length that is configured based on one or more constraints or features of the specific LLM engine being used (e.g., a particular LLM engine may receive up to N tokens or words or symbols as input; or, may receive up to M tokens or words or symbols as input below a particular price-range or monetary cost threshold or computing cost threshold).

As indicated in block 215, upon finding a PII data-item in a document and then extracting the relevant Document Snippet, this particular document (or a copy thereof) and this particular Document Snippet are collected by (or, are routed to, or transferred to) a Local Collector unit, for further training/re-training/updating of a LLM that is utilized by the LLM engine.

Figure 2B:
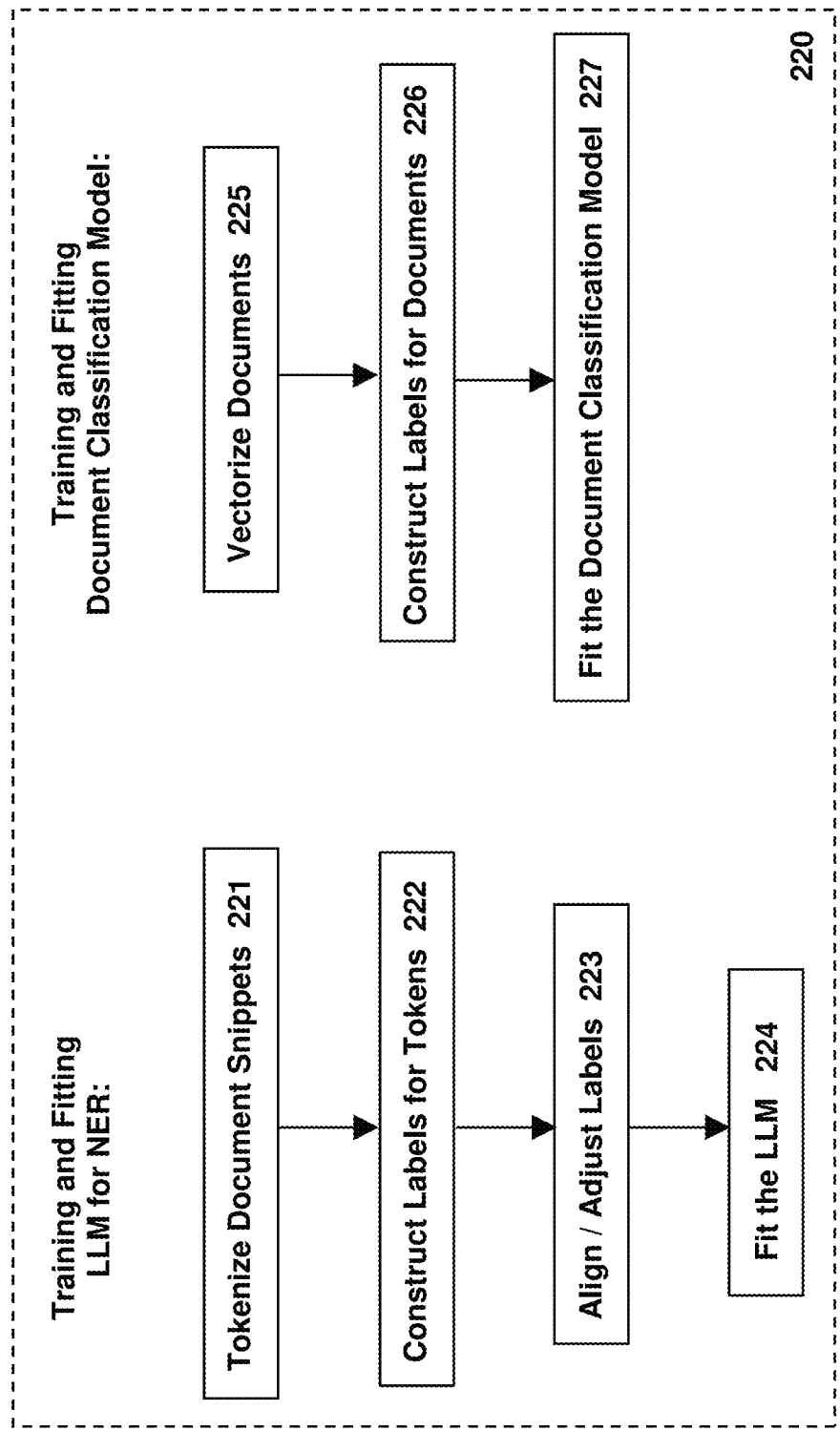
FIG. 2B is a flow-chart demonstrating a second stage in a three-stage method, in accordance with some demonstrative embodiments.

Reference is made to FIG. 2B, which is a flow-chart 220 demonstrating a second stage in a three-stage method, in accordance with some demonstrative embodiments. In this stage, the system performs training, re-training, updating and/or fitting of a particular model of a LLM engine, based on the particular body of knowledge or corpus of documents of the particular Protected Entity whose documents are being protected.

As indicated in blocks 221 to 224, the method includes training and fitting a LLM for NER. For example, a training set of Document Snippets is prepared: Tokenization of Document Snippets is performed (block 221), or one-dimensional/single-dimension vectorization of Document Snippets (e.g., using a vectorization method such as Term Frequency-Inverse Document Frequency (TF-IDF), or other vectorization methods); a set of labels is constructed (block 222); and labels are aligned or adjusted (block 223) to be consistent with (or, to more accurately track) sub-word tokenization or word-fragment tokenization (as well as whole-word tokenization). Then, to utilize the pre-trained LLM, for example, a linear layer is incorporated with SoftMax activation that is connected to the final hidden layer (or via other suitable means; or other normalized exponential function, or other suitable activation function that scales numbers or logits into probabilities and outputs a vector with the probabilities of each possible outcome; or other function that generalizes logit-based or logistic function to multiple dimensions; or a suitable multinomial logistic regression function or sets-of-functions; or other suitable activation function and particularly a last activation function of a neural network (NN) that normalizes the output of the NN to a probability distribution over predicted output classes), and the LLM is fit (block 224). In some embodiments, the step of fitting the LLM may include one or more iterations in which parameters or keys of the LLM are modified or adjusted, to increase its accuracy, to prevent or cure over-fitting, to prevent or cure under-fitting, to reduce error level, and/or to otherwise improve the matching between outputs of the LLM and "ground-truth" results that are known to be correct, and/or to otherwise modify or adjust LLM parameters to reduce the difference between the data that it outputs and the ground-truth data (e.g., using Weber's Law and by finding the best fitting Weber fraction). In some embodiments, for example, a pre-tokenization (or pre-vectorization) process may optionally be performed on some documents or document-portions or document snippets, to prevent or reduce over-fitting; for example, by replacing a detected string of digits (e.g., a candidate for being an SSN or an I.D. number) with a generic pre-defined fixed string (e.g., "SSN-Here") or with a generic dynamically-encoded string (e.g., "SSN9" to replace an actual SSN; or "#9D" or "##9D" to replace an actual SSN; indicating that this is a replacement for a string of 9 consecutive digits, without necessarily knowing that this is an SSN); as such selective pre-tokenization replacement/encoding of strings may prevent or reduce over-fitting on specific numbers or digit-combinations.

As indicated in blocks 225 to 227, the method performs training and fitting of a Document Classification model. For example, vectorization of the documents is performed (block 225), such as by using Term Frequency-Inverse Document Frequency (TF-IDF) or other vectorization methods; and the documents are then labeled (block 226) according to PII findings, for example, by generating or selecting a label for each vectorized document. In some implementations, if two or more labels are possible or are suitable for a particular vectorized document, the method may be configured to select or to prefer the label that is pre-associated with the highest level (or the higher level) of risk or exposure, based on a pre-defined list or table of labels and their associated risk level or exposure level. Then, the Document Classification model is fit (block 227), using a weighted combination of Machine Learning classification algorithms (e.g., Naive Bayes, Random Forest, Logistic Regression, Support Vector Machine (SVM), Gradient-Boosted Decision Tree (GBDT), Extreme Gradient Boosting such as XGBoost, and/or other algorithms). The techniques that were discussed above for model fitting, may similarly be used here.

For demonstrative purposes, flow-chart 220 is shown as having two sets of operations depicted side-by-side; however, this is only a non-limiting example, and operations or groups of operations may be performed in other order, in series, in parallel, simultaneously or at least partially concurrently (e.g., by two or more processing units), by a single unit or component, by two (or more) units or components, or the like.

Figure 2C:
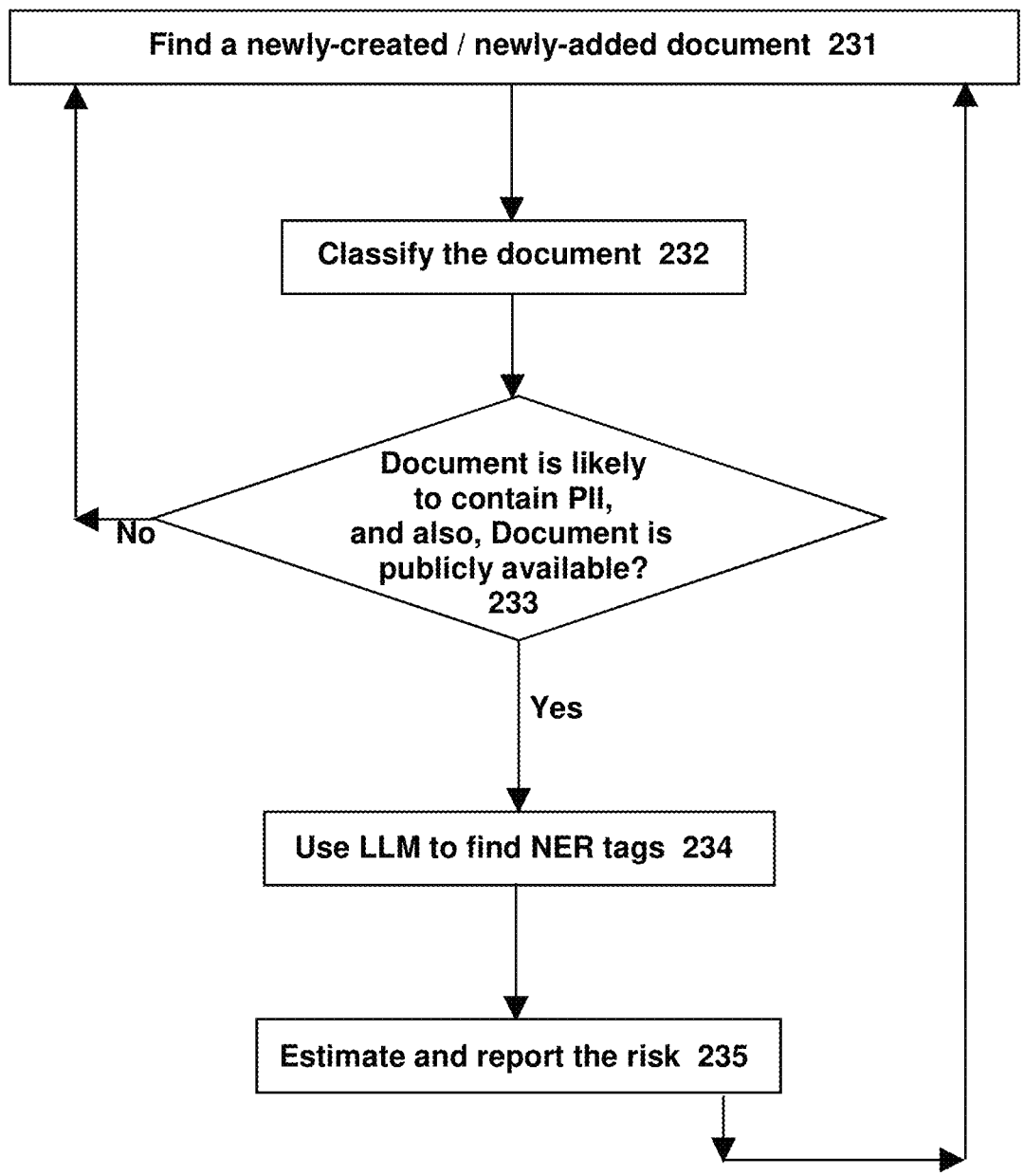
FIG. 2C is a flow-chart demonstrating a third stage in a three-stage method, in accordance with some demonstrative embodiments.

Reference is made to FIG. 2C, which is a flow-chart demonstrating a third stage in a three-stage method, in accordance with some demonstrative embodiments. In this stage, the system performs additional search and classification with regard to recently-modified/recently-added documents (e.g., documents that were modified/re-saved since their most-recent search for PII; documents that were newly created since the most-recent search for PII).

As indicated in block 231, the method includes performing a search or a scan of the data-center or repository of the Protected Entity, to locate newly-created/newly-added documents or files and/or newly-modified/recently-updated documents or files.

As indicated in block 232, once such newly-created/recently-modified document or file is found, the method classifies it as either (i) containing PII or (ii) not containing PII, by using the operations describe in the second stage (FIG. 2B).

As indicate in block 233, the method checks (I) whether the document is more likely than not to be a candidate for containing PII, and/or whether the document is (currently, or is expected to be) publicly available (e.g., based on meta-data, based on the type or title of the document, based on the folder and/or drive in which the document is stored, based on the document containing the phrase "For Public Release" or conversely "Internal Draft", or other indicators).

If the document is not estimated to be a document that is more likely to contain PII (arrow "No"), or in other words, if the document is not suspected to be a candidate that contains PII (e.g., based on ML classification of the document; and/or based on deterministic rules that operate on meta-data of the document such as filename, and/or deterministic rules that operate on particular content-portions of the document such as a heading or a title within the document), then the method proceeds to handle the next document/file that is a recently-modified/newly-created document/file. The estimation whether a particular document is more likely than not to contain PII may be based on an evaluation of one or indicators or meta-data, or based on rule-based analysis of document meta-data and/or document content; for example, a document that is titled (in its heading) as "Confidential-Customer Record", and/or that has a filename of "Customer-Record-12345", and/or that is stored in a folder named "Confidential-Financial-Records", and/or that includes the string "Social Security Number", may be estimated by the system to be a document that is more likely than not to contain PII, and thus should undergo LLM-based analysis or processing if that document is publicly-accessible or is publicly-available, or is stored in a repository that is available or is accessible to the general public or to a subset of the general public (e.g., to registered users; to logged-in users). In contrast, a document that has a filename of "General FAQ", and/or is stored in a folder named "Non-Confidential-Information", and/or excludes any strings that are pre-defined to be PII indicators (e.g., the string "Social Security Number", the string "SSN", the string "Credit Card Number", the string "Date of Birth", or the like), may be estimated by the system to be a document that is more likely to not contain PII, and thus should not be routed to LLM-based processing or analysis for PII detection.

Conversely, if the document is estimated to be a document that is more likely to contain PII, and the document is publicly-available (arrow "Yes"), then the method proceeds with the operations of blocks 234 and onward: the method utilizes LLM to find NER tags in the document (block 234); and the method evaluates/estimates and reports the risk level or the exposure level (block 235) based on the type/amount/sensitivity level of the PII (if detected in the document) and/or the public availability of the document (if indeed available). In some embodiments, optionally, one or more pre-defined rules or criteria may be used to construct a Risk Score or n Exposure Score for a document, such as, in a scale of 0 (no risk, no exposure) to 100 (high risk, high exposure). For example, a rule may indicate that if the document contains first name and last name of an individual, then its Risk Score is increased by 5 points; a rule may indicate that if the document contains an SSN of an individual then its Risk Score is increased by 12 points; a rule may indicate that if the document is publicly available then its risk score is increased by 17 points; and so forth. Optionally, the system may be configured to report to an administrator, or to one or more user-defined recipients associated with the Protected Entity, with regard to the classification results and with regard to documents that are publicly available and have high Risk Score (e.g., greater than a pre-defined threshold value) as they contain one or more PII data-items. The method may then proceed to process the next newly-added/recently-modified document or file.

Figure 3:
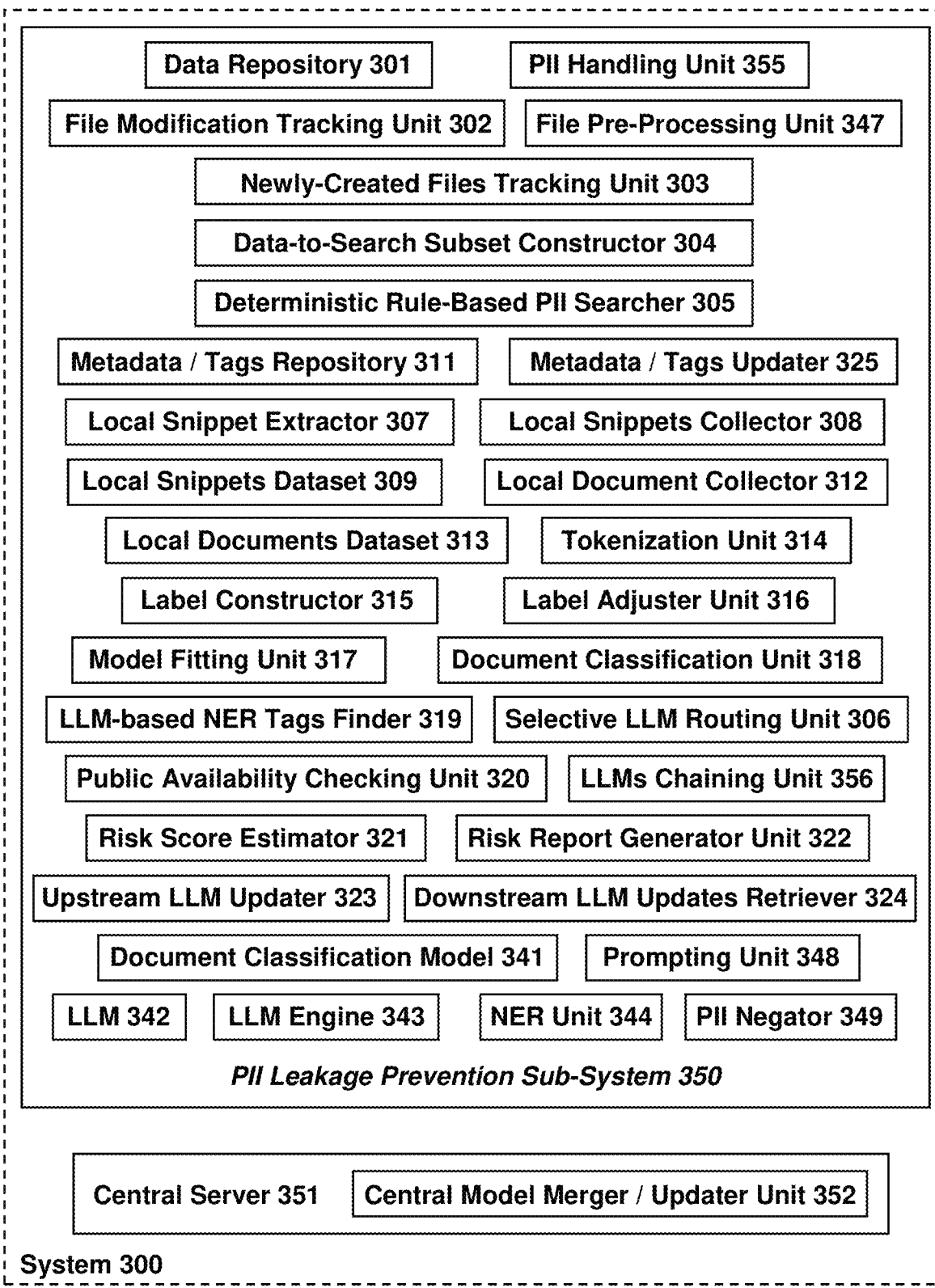
FIG. 3 is a schematic illustration of a system, in accordance with some demonstrative embodiments.

Reference is made to FIG. 3, which is a schematic illustration of a system 300, in accordance with some demonstrative embodiments.

For example, a Protected Entity may own or may control, or may be associated with, a Data Repository 301 that may store documents and other files. Data Repository 301 may be a local or on-premise repository, being physically located or co-located at or in a building in which the Protected Entity operates; or, Data Repository may be part of a cloud-computing platform or service, which provides storage services to the Protected Entity. Data Repository 301 may include documents and files of various types; for example, documents that were originally composed or created via a digital medium (e.g., a Microsoft Word document, a Microsoft PowerPoint file), and/or documents that were originally created via other means and were then digitized (e.g., a PDF file which is a scan of a printed paper, that underwent Optical Character Recognition (OCR) to recognize words and text therein and to become searchable by a machine that processes text or strings).

The computing system of the Protected Entity may include a File Modification Tracking Unit 302, which may continuously or periodically monitor and track modification(s) made to already-existing documents and/or files in Data Repository 301. Similarly, a Newly-Created Files Tracking Unit 303 may continuously or periodically monitor and track the creation or introduction of new files to Data Repository 301 (e.g., via an upload or download operation, via a file creation operation, via a file copying operation). Accordingly, a Data-to-Search Subset Constructor 304 may construct, and may dynamically update, a list or table that indicates which subset of the entirety of documents, that are stored in Data Repository 301, are newly-created or recently-updated, and are thus suitable search candidates for performing PII detection thereon.

In accordance with some embodiments, a File Pre-Processing Unit 347 may operate locally at or on the Data Repository 301 of the Protected Entity, to check whether each newly-created/recently-modified file is ready for text extraction/text analysis/textual tokenization/textual vectorization/LLM-based processing, and to perform one or more preparatory operations on files that are not yet entirely or fully ready for such processes. For example, the File Pre-Processing Unit 347 may detect that a first file, named "Contract.pdf", is a PDF file comprising seven pages, each page is an embedded JPG image of a scanned or photographed page, and that the text that is depicted in those images is not searchable/processable in its current image-based format; and accordingly, the File Pre-Processing Unit 347 may utilize an OCR module to perform OCR on that document, or on image-based regions or portions of such document, and to generate searchable and processable text, and to store such text inside the file or as an appendix or addendum to the file. Similar OCR processing operations may be performed with regard to DOC or DOCX file that may contain embedded images; with regard to presentation files (e.g., PowerPoint or Google Slides files) that may contain embedded images; and even with regard to video files that may contain frames which depict text (e.g., such that the system may perform OCR on one or more individual frames in such video file). In some embodiments, an audio file or an audio-and-video file may be automatically transcribed, using a transcription module or a speech-to-text converter module, to generate a textual transcript that can be appended to such file or may be otherwise associated with such file, to enable LLM-based processing and analysis of such textual transcript. Other suitable file preparation operations may be performed, as pre-processing operations or preparatory operations or conversion operations that then enable the system to textually process, search, tag, label, tokenize, and perform LLM-based analysis of files and documents.

A Deterministic Rule-Based PII Searcher 305 operates on a document-by-document basis, and searches for PII in each document that is indicated as a search candidate by the Data-to-Search Subset Constructor 304. The Deterministic Rule-Based PII Searcher 305 may utilize one or more RegEx tools and/or rules and/or definitions, searching for pre-defined string patterns or string structures that are typical of particular types of PII data-items. Upon detection of one or more PII data-items, a Metadata/Tags Updater 325 operates to update a Metadata/Tags Repository 311, to indicate that a particular document contains particular PII data-items, and to further indicate which type(s) of PII were detected therein (e.g., first-and-last name of an individual; SSN; credit card number); and optionally, to further indicate other metadata related to the detected PII data-items (e.g., a pre-defined risk level associated with each type of PII data-item; an exact or an approximately location of the PII data-item within the document, such as "on Page 3, Line 14 of Contract.PDF", or "in the top-half of Page 8 of Letter.DOCX").

For demonstrative purposes, and as a non-limiting example, some portions of the discussion above and/or herein may demonstrate some embodiments by referring to an individual's name; however, other types of PII data-items and/or Named Entities can be searched/tagged/labeled/detected; such as, for example, a person's role or title in an organization (e.g., the fact that John Smith is "CEO" or "CFO", or that Eve Brown is "Director" or "Shareholder"), an address, a telephone number, a person's income or salary or compensation data, an email address, a username/password/PIN of an individual or an entity, names and/or data of a confidential or non-publicly-available project or a product in development, and/or other protected data-item that the Protected Entity wishes to keep confidential and wishes to prevent its leakage. In some embodiments, such other types of data-items may be treated by the system as PII for extraction/labeling/tagging/searching/detection purposes; and the Protected Entity may provide to the system in advance the particular types of such data-items that should be detected and treated as PII data-items (e.g., a person's organizational role; a person's income; and so forth).

In accordance with some embodiments, a Selective LLM Routing Unit 306 is configured to selectively determine whether or not a particular document would be routed to an LLM-based process that further processes that document via LLM techniques. For example, the document "FAQ.pdf" was not found to contain any PII, and is thus not routed to further LLM-based processing, and is not utilized for LLM training; whereas, the document "Contract.DOC" was found to contain PII, and is thus routed to further LLM-based processing and/or is utilized for LLM training.

Furthermore, a Local Snippet Extractor 307 operates locally at or near (or is co-located with) the Data Repository 301, to locally extract the snippet (document portion) that immediately surrounds each PII data-item, such as the sentence or the paragraph that includes the PII data-item. A Local Snippets Collector 308 collects the snippets that were extracted from various documents, and dynamically creates or updates a Local Snippets Dataset 309; which is then used for LLM training for enabling NER tagging.

Similarly, a Local Document Collector 312 operates to collect each document that was detected to contain PII, to thereby dynamically construct and update a Local Documents Dataset 313, which in turn is similarly used for training of a Document Classification model.

A Tokenization Unit 314 performs tokenization (e.g., based on words, and in some situations based on sub-words or syllables or word-elements) or vectorization or single-dimension vectorization; and a Label Constructor 315 performs labelling of each token to the corresponding word (or string) in the text (of the snippet and/or of the document). A Label Adjuster Unit 316 may perform adjustment or correction of the exact location of each label, to ensure that it indeed points to (or is associated with) the exact word or sub-word to which it pertains. It is noted that in some embodiments, optionally, the Protected Entity whose data repository is being analyzed and protected against PII leakage, may provide a set of example documents (or, a set of example document snippets) that are pre-labeled or pre-classified by the Protected Entity with a particular label or tag or classification indicator; and such pre-provided dataset of exemplary documents or document snippets may be utilized by the system for improving or enhancing the labeling/classification of other documents of the Protected Entity. For example the Protected Entity may be a real estate brokerage firm and may provide seven examples of a "rental agreement" with a label indicating that the first page contains PII of landlord and/or tenant; or may provide eight examples of a snippet that includes the first twenty lines of such rental agreements with a label indicating that such snippets contains PII of landlord and/or tenant; and such pre-provided labeling or classification or tagging may be used to improve classification/labeling/tokenization/vectorization of documents or document snippets, and/or for an automated analysis that generates a set of deterministic rules that are tailored to automatically detect or label a particular type of document or of document snippet; for example, a rule that searches for the string "Rental Agreement" or "Lease Agreement", and for the strings "The landlord is:" and "The tenant is", in proximity of less than 50 characters of each other). Other deterministic rules may be generated based on such pre-provided/pre-labeled/pre-tagged/pre-classified examples of entire documents or document snippets from the Protected Entity.

A Model Fitting Unit 317 performs fitting (and optionally, subsequently, also re-fitting) of a relevant LLM and/or a Document Classification model. For example, a Document Classification Model 341 is trained and fitted based on the documents that were detected to contain PII and that were subject to tokenization and labeling; and a Document Classification Unit 318 is configured to utilize the Document Classification Model 341 for classification of a newly-created/recently-updated document as either containing PII or non-containing PII. Similarly, a LLM 342 (that is associated with a LLM Engine 343) is trained and fitted based on the extracted snippets that were detected to contain PII and that were subject to tokenization and labeling; and a LLM-based NER Tags Finder 319 is configured to find tags that are used by a NER Unit 344 that operates on a newly-created/recently-updated document.

In some embodiments, a Public Availability Checking Unit 320 operates to determine whether a particular document is publicly available/accessible to the general public (or, to a subset of the general public, such as, to pre-registered users or to logged-in users). This may be performed based on one or more indicators, for example, file name ("FAQ" versus "Confidential-Contract"), title or header or footer or heading within the document ("For Immediate Release" versus "Confidential and Privileged"), metadata indicating which user or which type-of-user created the file or modified the file (e.g., the Chief Financial Officer), and/or other data or metadata. A Risk Score Estimator 321 may estimate a Risk Score associated with each document, based on the number of PII data-items that were detected and/or the type(s) of PII data-items that were detected. A Risk Report Generator Unit 322 may operate continuously or periodically, to create and/or to dynamically update a report or a log that indicates which documents are associated with a Risk Score that is greater than a threshold value (N), or that is within a range-of-values (M to N), or the like.

In some embodiments, an Upstream LLM Updater 323 sends updates and fine-tuning insights that were generated locally at or near the Data Repository 301, upstream towards a Central Server 351 that may serve a plurality of separate data repositories of the same Protected Entity; to ensure that each such Data Repository later enjoys the fine-tuning/training insights that were generated by other data repositories of the same Protected Entity that thus provide federated learning. Periodically, such as daily or weekly, each such Data Repository may use a Downstream LLM Updates Retriever 324 to obtain an updated version of the LLM 342 and/or the Document Classification Model 341, which are prepared or merged by a Central Model Merger/Updater Unit 352.

In some embodiments, instead of performing some of the operations of FIGS. 2A to 2C, or in addition to those operations, the system may optionally utilize prompts to trigger an LLM engine to find PII within documents and/or to provide labels or tags that NER can then utilize for PII detection. For example, some embodiments may utilize a Prompting Unit 348 to provide one or more prompts to the LLM engine, commanding the LLM engine to utilize its own general knowledge in order to detect PII and/or to detect labels or tags for NER processing. For example, the Prompting Unit 348 may provide to the LLM engine the prompt "please perform textual analysis of Document A and provide an output that indicates whether and where exactly it contains a date-of-birth of a human", or the prompt "please perform a textual analysis of Document B, and provide an output that indicates which types of PII data-items are contained in Document B, together with their exact locations within Document B", or the prompt "please perform a textual analysis of Document C and Document D and Document E, and generate an output that indicates which one of those three documents is most likely to contain a PII data-item". In some embodiments, a pool or bank of pre-defined prompts may be used by the Prompting Unit 348, which may select one or more prompts based on one or more selection rules and/or pseudo-randomly and/or based on indicators obtained from the document's content or metadata.

In some embodiments, optionally, the system may further comprise a PII Negator Unit 349, whose role is to negate or discard an initially-reached estimation that a particular document contains PII or that a particular data-item is PII, or to perform another negation process that determines or that estimates that a particular string of characters, that appears to be (by itself, or in context) a PII data-item, is actually not a PII data-item; for example, based on pre-defined rules or lists or knowledge base or dictionary files or other non-PII datasets. In a first example, Document A may include the sentence "This letter of guarantee is provided in accordance with the law that was enacted by Congress and that was signed by Ronald Reagan on Apr. 15, 1985"; an initial analysis may indicate that "Ronald Reagan" appears to be a PII of the type "first name and family name of an individual", and that "Mar. 15, 2023" may also be a PII of the type "date of birth". However, the PII Negator Unit 349 may operate to negate or discard such initial classification, based on one or more rules or datasets of techniques. For example, PII Negator Unit 349 may utilize a "blacklist" of names (e.g., politician names, celebrity names) to determine that a string that appears to be the name of an individual that is supposed to be protected as PII, is actually a name of a famous person that typically appears in thousands of non-personal documents. Additionally or alternatively, the PII Negator Unit 349 may utilize a "whitelist" of names, such as a list of customers/clients of the Protected Entity, to check whether a string that was initially detected to be a PII data-item, indeed corresponds to at least one customer/client of the Protected Entity. Additionally or alternatively, the PII Negator Unit 349 may utilize other rules or datasets; for example, a textual or contextual analysis via Natural Language Processing (NLP) may indicate that the above-mentioned sentence describes an act of the government and does not relate to a particular individual customer/client, thereby negating and discarding the initial or temporary detection of PII. Other suitable rules or conditions may be used. The PII Negator Unit 349 may operate to negate the identification as PII of not only names/first names/family names/full names, but rather, also other types of suspected PII, based on one or more other rules. For example, an initial analysis may indicate that the string "000-00-0000" is a PII of the type "SSN"; however, a pre-defined rule may indicate that there does not exist a valid SSN that consists of nine consecutive "0" digits, and thus the initial classification or labeling of the string "000-00-0000" as an SSN may be negated or reversed. In some embodiments, the PII Negator Unit 349 may perform other and/or additional operations; for example, it may receive, in a feedback loop, an indication from the Protected Entity that a particular estimation/detection of a particular PII data-item is incorrect; and based on such indication, the PII Negator Unit 349 may dynamically modify one or more parameters of a Machine Learning document classification unit, and/or may dynamically configure weights and/or parameters used by the LLM engine; and/or may dynamically define one or more rules or conditions for negating an initial estimation of PII with regard to particular strings or types-of-strings; or may perform or define other negation operations. In some embodiments, optionally, the PII Negator Unit 349 may be configured to perform LLM data augmentation by generating or providing a curated dataset, and/or to perform re-training and/or re-fitting of the LLM based on (or, by taking into account) counter-examples or augmentation data or other context or contextual data for such re-training or re-fitting (e.g., an automatically curated dataset of negative examples of snippets that are initially suspected to contain PII but are then negated and are evaluated as not containing PII).

In some embodiments, exactly one LLM is used to perform the analysis of documents and/or document snippets, and/or to perform LLM-based detection or recognition or estimation of labels or tags that can then be utilized by a NER unit to detect PII data-items in document. In some of those embodiments, optionally, this single LLM is trained or re-trained specifically on (or, is augmented by) a set of documents and/or documents snippets that belong to a particular Protected Entity and/or that are associated with a particular Protected Entity; and/or, this single LLM is trained or re-trained specifically on (or, is augmented by) a private/confidential/non-public/not-publicly-available body-of-knowledge that includes a list of customers/clients/business associates of that particular Protected Entity, to further improve the accuracy of the LLM-based process for detecting PII in documents of that particular Protected Entity; without exposing such private/confidential/non-public/not-publicly-available body-of-knowledge with any third party and without sharing such private/confidential/non-public/not-publicly-available body-of-knowledge with any third party.

In other embodiments, exactly two LLMs are utilized: for example, a first LLM that is trained (or re-trained) only on (or, is augmented by) Document Snippets that were already extracted (from documents of that Protected Entity) based on deterministic rules, and a second LLM that is trained (or re-trained) only on (or, is augmented by) Entire Documents of that Protected Entity. The results or outputs of such two LLMs may be combined or aggregated; or may be used in series; or may be used by utilizing an "OR" Boolean operator (e.g., a document is evaluated to contain PII, if the first LLM or the second LLM (or both of them) generated LLM-based output that indicates PII detection); or may be used by utilizing an "AND" Boolean operator (e.g., a document is evaluated to contain PII, if the first LLM and also the second LLM generated LLM-based output that indicates PII detection); and/or by using the outputs of one LLM or both LLMs in combination with deterministic/rule-based/RegEx based/NER based detection results.

In still other embodiments, more than two LLMs are utilized in combination: for example, a first LLM that is trained or re-trained only (or particularly, or additionally) on Document Snippets that were already extracted (from documents of that Protected Entity) based on deterministic rules; and a second LLM that is trained or re-trained only (or particularly, or additionally) on Entire Documents of that Protected Entity; and a third (or Nth) LLM that is trained or re-trained on other particular data-portions and/or meta-data; such as, a third (or Nth) LLM that is trained or re-trained only (or particularly, or additionally) on filenames of documents; a third (or Nth) LLM that is trained or re-trained only (or particularly, or additionally) on Document Titles and/or Content Headings (e.g., chapter headings, section headings) that are within documents; a third (or Nth) LLM that is trained or re-trained only (or particularly, or additionally) on aliases or names of locations/folders/drives in which documents are stored (e.g., training or re-training the LLM that documents that are stored in the folder "Customer-Records" are typically more likely to contain PII, relative to documents that are stored in the folder "General-Product-Info"); a third (or Nth) LLM that is trained or re-trained only (or particularly, or additionally) on meta-data of documents e.g., document size as measured in bytes or kilobytes, or document length as measured in pages or in word-count; in some types of Protected Entities, a longer document may be associated with an increased probability of containing PII, such as a mortgage provider that uses long mortgage contracts that typically contain PII of loan-taking customers; whereas conversely, in some other types of Protected Entities, a longer document may be associated with a reduced probability of containing PII, such as a manufacturer of electronic gadgets whose long documents are typically a "User Manual" or a "Technical Specification" type of documents); a third (or Nth) LLM that is trained or re-trained only on a particular binary parameter (e.g., whether a document includes only text, or includes both text and one or more images); a third (or Nth) LLM that is trained or re-trained only (or particularly, or additionally) on a trinary or a tri-value parameter (e.g., a trinary parameter indicating whether a document includes only digitally-created text, or only OCRed text, or a mixture of both digitally-created text and OCRed text; or, a trinary parameter indicating whether a document includes only text, or only images, or a mixture of text and images); and/or other types of LLMs that may be used on combination or in series or in the aggregate, or by utilizing a set of rules or conditions for combining and/or discarding and/or prioritizing and/or weighting the results of each such LLM.

In some embodiments, an LLM Chaining Unit 356 may be responsible for combining and/or discarding and/or prioritizing and/or weighting and/or ordering or otherwise handling the results or outputs of such multiple LLMs, or for assigning a particular weight to each such output and/or for utilizing a weighted formula for combining the plurality of LLM-based outputs. In some embodiments, since the activation or utilization of a particular LLM may be computationally intensive, the LLM Chaining Unit 356 may also be responsible for selectively and dynamically determining, whether to apply a second or third or Nth LLM, on a document (or document snippet, or document portion) that was already subjected to LLM-based analysis by a first LLM; or for selectively and dynamically determining, whether to apply a third or Nth LLM, on a document (or document snippet, or document portion) that was already subjected to LLM-based analysis by a first LLM and by a second LLM; and so forth.

In accordance with some embodiments, all the components of system 300, except for the Central Server 351 and the Central Model Merger/Updater Unit 352, may be implemented as local components or as a local sub-unit or a local sub-system that operates at or in or near (or is co-located with) the particular Data Repository 301 of the particular Protected Entity; such as, implemented as a PII Leakage Prevention Sub-System 350 which includes the Data Repository 301 or that is co-located with Data Repository 301 or that is operably associated directly with Data Repository 301.

The above-mentioned architecture and structure have various functional benefits. Firstly, it improves security and resilience to attacks, as documents and/or snippets and/or PII are not uploaded and are not transmitted to a remote server or to a central server or to a remote LLM provider. Secondly, it provides tailoring of the classification model/LLM to the particular type of documents that are typically found at the relevant Protected Entity, such that documents that are typically found in a data repository of a banking institution are used specifically to train or re-train the classification model/the LLM that is then used on other documents of that banking institution; whereas, documents that are typically found in a data repository of a law firm are used specifically to train or re-train the classification model/the LLM that is then used on other documents of that law firm. Thirdly, local training (and/or re-training and/or re-fitting, and/or data augmentation) and processing may speed-up operations and may result in a faster automatic detection of PII in a large corpus of documents, as documents need not be uploaded or transmitted to a remote server, and as processing results need not be retrieved from a remote processing server.

In some embodiments, Data Repository 301 is further associated with a PII Handling Unit 355, configured to enforce or implement one or more rules with regard to documents that were tagged as containing PII, and/or configured to perform one or more operations on such documents. For example, PII Handling Unit 355 may move PII-containing documents from a first folder to a second folder; may move PII-containing documents from a first drive or storage medium or server. to a second drive or storage medium or server; may delete or discard a document that was detected as containing PII (e.g., based on one or more discarding rules, such as, if the document's age is at least N years old); may quarantine such documents for manual inspection by a human operator or by another Artificial Intelligence (AI) engine; may perform redaction or hiding or replacement of PII data-items (e.g., overwriting them with black boxes, or with "all zero" values or "all X" values); defining or setting or modifying access control or access privileges or access constraints with regard to documents that were detected to contain PII (for example, only the CFO and not the Sales Team may access PII-containing documents); and/or may perform other operations, based on user-defined rules that may be set or modified by a system administrator.

Some embodiments may operate efficiently and/or accurately even in a system in which the data repository of the Protected Entity cannot be manually labeled (at all, or at least partially) due to organizational constraints or corporate limitations or technological constraints; for example, a data repository that cannot or that must not be configured to be accessible to any human labeling providers outside of the Protected Entity (such as "Amazon Mechanical Turk" labeling providers).

Some embodiments provide a computerized method comprising: (a) performing a deterministic rule-based search, in a plurality of stored documents, for Personally Identifiable Information (PII) data-items; (b) if the deterministic rule-based search indicates that a particular document contains a PII data-item then: (b1) extracting a textual snippet from said particular document, wherein the textual snippet surrounds said PII data-item; (b2) adding an entirety of said particular document to a Machine Language classification dataset, that is utilized for training a Machine Learning (ML) engine to classify documents as either containing PII or non-containing PII; (b3) adding said textual snippet, and not the entirety of said particular document, to a second dataset utilized for training a Large Language Model (LLM) to find PII data-items in documents for performing Named Entity Recognition (NER) in said documents.

In some embodiments, the method further comprises: (c1) performing tokenization of the textual snippet; and (c2) constructing labels for tokens generated by the tokenization of step (c1); and (c3) aligning labels created in step (c2), with sub-word tokens; and (c4) fitting said LLM.

In some embodiments, the method further comprises: continuously monitoring a data repository of a Protected Entity for newly-created documents; automatically performing Machine Language classification of said newly-created document, to determine via Machine Learning whether said newly-created document contains PII or does not contain PII; if, and only if, the Machine Learning classification indicates that said newly-created document contains PII, then: (I) performing LLM analysis of said newly-created document for finding labels for NER processing, and (II) performing NER processing of said newly-created document based on LLM-determined labels.

In some embodiments, the method further comprises: continuously monitoring a data repository of a Protected Entity for recently-modified documents; automatically performing Machine Language classification of said recently-modified document, to determine via Machine Learning whether said recently-modified document contains PII or does not contain PII; if, and only if, the Machine Learning classification indicates that said recently-modified document contains PII, then: (I) performing LLM analysis of said recently-modified document for finding labels for NER processing, and (II) performing NER processing of said recently-modified document based on LLM-determined labels.

In some embodiments, the method comprises: protecting a document repository of a Protected Entity from leakage of PII; by performing said deterministic rule-based search for PII exclusively on-premise at said document repository of said Protected Entity and without uploading documents from said document repository of said Protected Entity to a remote server; and by training said LLM on document snippets extracted locally from documents of said document repository of said Protected Entity, exclusively on-premise at said document repository of said Protected Entity, and without uploading any document snippets or documents from said Protected Entity to a remote server; and by prompting said LLM to find labels for NER exclusively on-premise at said document repository of said Protected Entity and without uploading any document snippets or documents or from said Protected Entity to a remote server.

In some embodiments, said LLM is updated on a remote server, that is remote from said document repository of said Protected Entity, based on federated LLM-based analysis results that were generated locally on-premise at said document repository of said Protected Entity and at a plurality of other, separate, document repositories of said Protected Entity and that are collected by and merged at said remote server.

In some embodiments, the deterministic rule-based search comprises at least: a first automated rule-based PII search utilizing one or more Regular Expression (RegEX) tools; a second automated rule-based PII search utilizing one or more particular dictionary files.

In some embodiments, the method further comprises: generating an initial estimation that a particular document contains a particular type of PII data-item that is a name of an individual; performing a negation process that determines that said initial estimation is incorrect even though said particular document indeed contains said name of said individual.

In some embodiments, the method further comprises: generating an initial estimation that a particular document contains a particular type of PII data-item, based on at least one of: (i) Regular Expression (RegEx) tools, (ii) predefined dictionary files, (iii) Machine Language classification of an entirety of said particular document; performing a negation process that determines that said initial estimation is incorrect even though said particular document indeed contains a string that, by itself, appears to be a PII data-item.

In some embodiments, the negation process is based on a feedback loop in which a Protected Entity that controls said data repository provides an indication that the initial estimation is incorrect; wherein, based on said indication, at least one of the following operations is performed: (i) modifying one or more parameters of a Machine Language document classification unit that classifies documents as either containing PII or not-containing PII; (ii) modifying one or more parameters of said LLM.

In some embodiments, the negation process is based on a feedback loop in which a Protected Entity that controls said data repository provides an indication that the initial estimation is incorrect; based on said indication, automatically configuring or training said LLM to negate similar further estimations of PII detections that are actually not PII.

In some embodiments, said LLM comprises a plurality of LLMs. A first LLM of said plurality of LLMs is trained specifically on (or is augmented by) extracted document snippets of said data repository of a particular Protected Entity. A second LLM of said plurality of LLMs is trained specifically on (or is augmented by) an entirety of documents of said data repository of said particular Protected Entity.

In some embodiments, said LLM comprises a plurality of LLMs. A first LLM of said plurality of LLMs is trained specifically on (or is augmented by) extracted document snippets of a particular Protected Entity. A second LLM of said plurality of LLMs is trained specifically on (or is augmented by) entirety of documents of said particular Protected Entity; wherein at least one of the first LLM and the second LLM is further trained on a body-of-knowledge that includes at least: a dataset having names and data of customers and clients of said Protected Entity.

In some embodiments, said LLM comprises a plurality of LLMs. A first LLM of said plurality of LLMs is trained specifically on (or is augmented by) extracted document snippets of a particular Protected Entity. A second LLM of said plurality of LLMs is trained specifically on (or is augmented by) entirety of documents of said particular Protected Entity. The method comprises selective chaining of LLMs, wherein one of said plurality of LLMs is activated to perform LLM-based processing of a particular document only if another one of said plurality of LLMs has already performed LLM-based processing of said particular document and has already generated a particular type of output.

In some embodiments, said LLM, that is configured to find PII data-items in documents for NER, is specifically augmented with document snippets that include customer names that match a dataset of names of current customers of a Protected Entity whose documents are in the data repository that is searched for PII. In some embodiments, said LLM, that is configured to find PII data-items in documents for NER, is specifically augmented with document snippets that include financial data-items that match a dataset of financial records of a Protected Entity whose documents are in the data repository that is searched for PII.

In some embodiments, said LLM, that is configured to find PII data-items in documents for NER, is specifically trained on (i) content of documents of a Protected Entity whose documents are in the data repository that is searched for PII, and also (ii) meta-data of said documents.

In some embodiments, the method further comprises: performing a Named Entity Recognition (NER) process to identify PII data-items in documents of a particular Protected Entity, based on NER tags that were established via an LLM-based processing of at least one of: (i) entirety of documents of said particular Protected Entity, (ii) extracted document snippets that were extracted from documents of said particular Protected Entity; wherein said LLM-based processing utilizes at least one LLM that was specifically trained on a body-of-knowledge that includes at least one of: (I) a dataset of current customers of said Protected Entity, (II) financial records of said Protected Entity, (III) legal records of said Protected Entity.

Some embodiments provide a non-transitory storage medium having stored thereon instructions that, when executed by a machine, cause the machine to perform a method as described above and/or herein.

Some embodiments provide a system comprising: one or more hardware processors, configured to execute code; associated with one or more memory units, configured to store data; wherein the one or more hardware processors are configured to perform an automated process or method as describe above and/or herein.

Although portions of the discussion herein relate, for demonstrative purposes, to wired links and/or wired communications, some embodiments are not limited in this regard, and may include one or more wired or wireless links, may utilize one or more components of wireless communication, may utilize one or more methods or protocols of wireless communication, or the like. Some embodiments may utilize wired communication and/or wireless communication.

Some embodiments may be implemented by using hardware units, software units, processors, CPUs, DSPs, integrated circuits, memory units, storage units, wireless communication modems or transmitters or receivers or transceivers, cellular transceivers, a power source, input units, output units, Operating System (OS), drivers, applications, and/or other suitable components.

Some embodiments may be implemented by using a special-purpose machine or a specific-purpose that is not a generic computer, or by using a non-generic computer or a non-general computer or machine. Such system or device may utilize or may comprise one or more units or modules that are not part of a "generic computer" and that are not part of a "general purpose computer", for example, cellular transceivers, cellular transmitter, cellular receiver, GPS unit, location-determining unit, accelerometer(s), gyroscope(s), device-orientation detectors or sensors, device-positioning detectors or sensors, or the like.

Some embodiments may be implemented by using code or program code or machine-readable instructions or machine-readable code, which is stored on a non-transitory storage medium or non-transitory storage article (e.g., a CD-ROM, a DVD-ROM, a physical memory unit, a physical storage unit), such that the program or code or instructions, when executed by a processor or a machine or a computer, cause such device to perform a method in accordance with the present invention.

Some embodiments may be utilized with a variety of devices or systems having a touch-screen or a touch-sensitive surface; for example, a smartphone, a cellular phone, a mobile phone, a smart-watch, a tablet, a handheld device, a portable electronic device, a portable gaming device, a portable audio/video player, an Augmented Reality (AR) device or headset or gear, a Virtual Reality (VR) device or headset or gear, a "kiosk" type device, a vending machine, an Automatic Teller Machine (ATM), a laptop computer, a desktop computer, a vehicular computer, a vehicular dashboard, a vehicular touch-screen, or the like.

The system(s) and/or device(s) of some embodiments may optionally comprise, or may be implemented by utilizing suitable hardware components and/or software components; for example, processors, processor cores, Central Processing Units (CPUs), Digital Signal Processors (DSPs), circuits, Integrated Circuits (ICs), controllers, memory units, registers, accumulators, storage units, input units (e.g., touch-screen, keyboard, keypad, stylus, mouse, touchpad, joystick, trackball, microphones), output units (e.g., screen, touch-screen, monitor, display unit, audio speakers), acoustic microphone(s) and/or sensor(s), optical microphone(s) and/or sensor(s), laser or laser-based microphone(s) and/or sensor(s), wired or wireless modems or transceivers or transmitters or receivers, GPS receiver or GPS element or other location-based or location-determining unit or system, network elements (e.g., routers, switches, hubs, antennas), and/or other suitable components and/or modules.

The system(s) and/or devices of some embodiments may optionally be implemented by utilizing co-located components, remote components or modules, "cloud computing" servers or devices or storage, client/server architecture, peer-to-peer architecture, distributed architecture, and/or other suitable architectures or system topologies or network topologies.

In accordance with some embodiments, calculations, operations and/or determinations may be performed locally within a single device, or may be performed by or across multiple devices, or may be performed partially locally and partially remotely (e.g., at a remote server) by optionally utilizing a communication channel to exchange raw data and/or processed data and/or processing results.

Some embodiments may be implemented by using a special-purpose machine or a specific-purpose device that is not a generic computer, or by using a non-generic computer or a non-general computer or machine. Such system or device may utilize or may comprise one or more components or units or modules that are not part of a "generic computer" and that are not part of a "general purpose computer", for example, cellular transceivers, cellular transmitter, cellular receiver, GPS unit, location-determining unit, accelerometer(s), gyroscope(s), device-orientation detectors or sensors, device-positioning detectors or sensors, or the like.

Some embodiments may be implemented as, or by utilizing, an automated method or automated process, or a machine-implemented method or process, or as a semi-automated or partially-automated method or process, or as a set of steps or operations which may be executed or performed by a computer or machine or system or other device.

Some embodiments may be implemented by using code or program code or machine-readable instructions or machine-readable code, which may be stored on a non-transitory storage medium or non-transitory storage article (e.g., a CD-ROM, a DVD-ROM, a physical memory unit, a physical storage unit, a Flash drive), such that the program or code or instructions, when executed by a processor or a machine or a computer, cause such processor or machine or computer to perform a method or process as described herein. Such code or instructions may be or may comprise, for example, one or more of: software, a software module, an application, a program, a subroutine, instructions, an instruction set, computing code, words, values, symbols, strings, variables, source code, compiled code, interpreted code, executable code, static code, dynamic code; including (but not limited to) code or instructions in high-level programming language, low-level programming language, object-oriented programming language, visual programming language, compiled programming language, interpreted programming language, C, C++, C#, Java, JavaScript, SQL, Ruby on Rails, Go, Cobol, Fortran, ActionScript, AJAX, XML, JSON, Lisp, Eiffel, Verilog, Hardware Description Language (HDL), BASIC, Visual BASIC, MATLAB, Pascal, HTML, HTML5, CSS, Perl, Python, PHP, machine language, machine code, assembly language, or the like.

Discussions herein utilizing terms such as, for example, "processing", "computing", "calculating", "determining", "establishing", "analyzing", "checking", "detecting", "measuring", or the like, may refer to operation(s) and/or process (es) of a processor, a computer, a computing platform, a computing system, or other electronic device or computing device, that may automatically and/or autonomously manipulate and/or transform data represented as physical (e.g., electronic) quantities within registers and/or accumulators and/or memory units and/or storage units into other data or that may perform other suitable operations.

Some embodiments of the present invention may perform steps or operations such as, for example, "determining", "identifying", "comparing", "checking", "querying", "searching", "matching", and/or "analyzing", by utilizing, for example: a pre-defined threshold value to which one or more parameter values may be compared; a comparison between (i) sensed or measured or calculated value(s), and (ii) pre-defined or dynamically-generated threshold value(s) and/or range values and/or upper limit value and/or lower limit value and/or maximum value and/or minimum value; a comparison or matching between sensed or measured or calculated data, and one or more values as stored in a look-up table or a legend table or a list of reference value(s) or a database of reference values or ranges; a comparison or matching or searching process which searches for matches and/or identical results and/or similar results and/or sufficiently-close results (e.g., within a pre-defined threshold level of similarity; such as, within 5 percent above or below a pre-defined threshold value), among multiple values or limits that are stored in a database or look-up table; utilization of one or more equations, formula, weighted formula, and/or other calculation in order to determine similarity or a match between or among parameters or values; utilization of comparator units, lookup tables, threshold values, conditions, conditioning logic, Boolean operator(s) and/or other suitable components and/or operations.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments", "some embodiments", and/or similar terms, may indicate that the embodiment(s) so described may optionally include a particular feature, structure, or characteristic, but not every embodiment necessarily includes the particular feature, structure, or characteristic. Repeated use of the phrase "in one embodiment" does not necessarily refer to the same embodiment, although it may. Repeated use of the phrase "in some embodiments" does not necessarily refer to the same set or group of embodiments, although it may.

As used herein, and unless otherwise specified, the utilization of ordinal adjectives such as "first", "second", "third", "fourth", and so forth, to describe an item or an object, merely indicates that different instances of such like items or objects are being referred to; and does not intend to imply as if the items or objects so described must be in a particular given sequence, either temporally, spatially, in ranking, or in any other ordering manner.

Some embodiments may comprise, or may be implemented by using, an "app" or application which may be downloaded or obtained from an "app store" or "applications store", for free or for a fee, or which may be pre-installed on a computing device or electronic device, or which may be transported to and/or installed on such computing device or electronic device.

Functions, operations, components and/or features described herein with reference to one or more embodiments of the present invention, may be combined with, or may be utilized in combination with, one or more other functions, operations, components and/or features described herein with reference to one or more other embodiments of the present invention. The present invention may comprise any possible combinations, re-arrangements, assembly, re-assembly, or other utilization of some or all of the modules or functions or components that are described herein, even if they are discussed in different locations or different chapters of the above discussion, or even if they are shown across different drawings or multiple drawings.

While certain features of some embodiments have been illustrated and described herein, many modifications, substitutions, changes, and equivalents may occur to those skilled in the art. Accordingly, the claims are intended to cover all such modifications, substitutions, changes, and equivalents.

What is claimed is:

1. A computerized method comprising:
   (a) performing a deterministic rule-based search, in a plurality of stored documents, for Personally Identifiable Information (PII) data-items; and
   (b) responsive to the deterministic rule-based search indicating that a particular document contains a PII data-item,
      (b1) extracting a textual snippet from said particular document, wherein the textual snippet surrounds said PII data-item,
      (b2) adding an entirety of said particular document to a Machine Language classification dataset, that is utilized for training a Machine Learning (ML) engine to classify documents as either containing PII or non-containing PII, and
      (b3) adding said textual snippet, and not the entirety of said particular document, to a second dataset utilized for training a Large Language Model (LLM) to find PII data-items in documents for performing Named Entity Recognition (NER) in said documents.

2. The computerized method of claim 1, further comprising:
   (c1) performing tokenization of the textual snippet;
   (c2) constructing labels for tokens generated by the tokenization of step (c1);
   (c3) aligning labels created in step (c2), with sub-word tokens;
   (c4) fitting said LLM.

3. The computerized method of claim 2, further comprising:
   continuously monitoring a data repository of a Protected Entity for newly-created documents;
   automatically performing Machine Language classification of said newly-created document, to determine via Machine Learning whether said newly-created document contains PII or does not contain PII;
   if, and only if, the Machine Learning classification indicates that said newly-created document contains PII, then: (I) performing LLM analysis of said newly-created document for finding labels for NER processing, and (II) performing NER processing of said newly-created document based on LLM-determined labels.

4. The computerized method of claim 2, further comprising:
   continuously monitoring a data repository of a Protected Entity for recently-modified documents;
   automatically performing Machine Language classification of said recently-modified document, to determine via Machine Learning whether said recently-modified document contains PII or does not contain PII;
   if, and only if, the Machine Learning classification indicates that said recently-modified document contains PII, then: (I) performing LLM analysis of said recently-modified document for finding labels for NER processing, and (II) performing NER processing of said recently-modified document based on LLM-determined labels.

5. The computerized method of claim 1, comprising:
   protecting a document repository of a Protected Entity from leakage of PII,
   by performing said deterministic rule-based search for PII exclusively on-premise at said document repository of said Protected Entity and without uploading documents from said document repository of said Protected Entity to a remote server, and by training said LLM on document snippets extracted locally from documents of said document repository of said Protected Entity, exclusively on-premise at said document repository of said Protected Entity, and without uploading any document snippets or documents from said Protected Entity to a remote server, and by prompting said LLM to find labels for NER exclusively on-premise at said document repository of said Protected Entity and without uploading any document snippets or documents or from said Protected Entity to a remote server.

6. The computerized method of claim 5,
wherein said LLM is updated on a remote server, that is remote from said document repository of said Protected Entity, based on federated LLM-based analysis results that were generated locally on-premise at said document repository of said Protected Entity and at a plurality of other, separate, document repositories of said Protected Entity and that are collected by and merged at said remote server.

7. The computerized method of claim 1,
wherein the deterministic rule-based search comprises at least:
a first automated rule-based PII search utilizing one or more Regular Expression (RegEX) tools;
a second automated rule-based PII search utilizing one or more particular dictionary files.

8. The computerized method of claim 1, further comprising:
generating an initial estimation that a particular document contains a particular type of PII data-item that is a name of an individual;
performing a negation process that determines that said initial estimation is incorrect even though said particular document indeed contains said name of said individual.

9. The computerized method of claim 1, further comprising:
generating an initial estimation that a particular document contains a particular type of PII data-item, based on at least one of: (i) Regular Expression (RegEx) tools, (ii) pre-defined dictionary files, (iii) Machine Language classification of an entirety of said particular document;
performing a negation process that determines that said initial estimation is incorrect even though said particular document indeed contains a string that, by itself, appears to be a PII data-item.

10. The computerized method of claim 9,
wherein the negation process is based on a feedback loop in which a Protected Entity that controls said data repository provides an indication that the initial estimation is incorrect;
wherein, based on said indication, at least one of the following operations is performed:
(i) modifying one or more parameters of a Machine Language document classification unit that classifies documents as either containing PII or not-containing PII;
(ii) modifying one or more parameters of said LLM.

11. The computerized method of claim 9,
wherein the negation process is based on a feedback loop in which a Protected Entity that controls said data repository provides an indication that the initial estimation is incorrect;
based on said indication, automatically configuring or training said LLM to negate similar further estimations of PII detections that are actually not PII.

12. The computerized method of claim 1,
wherein said LLM comprises a plurality of LLMs;
wherein a first LLM of said plurality of LLMs is trained specifically on, or augmented specifically with, extracted document snippets of said data repository of a particular Protected Entity;
wherein a second LLM of said plurality of LLMs is trained specifically on, or augmented specifically with, entirety of documents of said data repository of said particular Protected Entity.

13. The computerized method of claim 1,
wherein said LLM comprises a plurality of LLMs;
wherein a first LLM of said plurality of LLMs is trained specifically on, or augmented specifically with, extracted document snippets of a particular Protected Entity;
wherein a second LLM of said plurality of LLMs is trained specifically on, or augmented specifically with, entirety of documents of said particular Protected Entity;
wherein at least one of the first LLM and the second LLM is further trained on, or augmented with, a body-of-knowledge that includes at least: a dataset having names and data of customers and clients of said Protected Entity.

14. The computerized method of claim 1,
wherein said LLM comprises a plurality of LLMs;
wherein a first LLM of said plurality of LLMs is trained specifically on, or augmented specifically with, extracted document snippets of a particular Protected Entity;
wherein a second LLM of said plurality of LLMs is trained specifically on, or augmented specifically with, entirety of documents of said particular Protected Entity;
wherein the method comprises selective chaining of LLMs, wherein one of said plurality of LLMs is activated to perform LLM-based processing of a particular document only if another one of said plurality of LLMs has already performed LLM-based processing of said particular document and has already generated a particular type of output.

15. The computerized method of claim 1,
wherein said LLM, that is configured to find PII data-items in documents for NER, is specifically augmented with document snippets that include customer names that match a dataset of names of current customers of a Protected Entity whose documents are in the data repository that is searched for PII.

16. The computerized method of claim 1,
wherein said LLM, that is configured to find PII data-items in documents for NER, is specifically augmented with document snippets that include financial data-items that match a dataset of financial records of a Protected Entity whose documents are in the data repository that is searched for PII.

17. The computerized method of claim 1,
wherein said LLM, that is configured to find PII data-items in documents for NER, is specifically trained on, or augmented with, (i) content of documents of a Protected Entity whose documents are in the data repository that is searched for PII, and also (ii) meta-data of said documents.

18. The computerized method of claim 1,
further comprising:
performing a Named Entity Recognition (NER) process to identify PII data-items in documents of a particular Protected Entity, based on NER tags that were established via an LLM-based processing of at least one of: (i) entirety of documents of said particular Protected Entity, (ii) extracted document snippets that were extracted from documents of said particular Protected Entity;

wherein said LLM-based processing utilizes at least one LLM that was specifically trained on, or augmented with, a body-of-knowledge that includes at least one of: (I) a dataset of current customers of said Protected Entity, (II) financial records of said Protected Entity, (III) legal records of said Protected Entity.

19. A non-transitory storage medium having stored thereon instructions that, when executed by a machine, cause the machine to perform a method comprising:
- (a) performing a deterministic rule-based search, in a plurality of stored documents, for Personally Identifiable Information (PII) data-items; and
- (b) responsive to the deterministic rule-based search indicating that a particular document is more likely than not to contain a PII data-item,
  - (b1) extracting a textual snippet from said particular document, wherein the textual snippets surrounds said PII data-item, and
  - (b2) adding said textual snippet and said particular document to one or more training datasets utilized for training a Large Language Model (LLM) configured to find PII data-items in documents for Named Entity Recognition (NER) in said documents.

20. A system comprising:
one or more hardware processors, configured to execute code;
associated with one or more memory units, configured to store data;
wherein the one or more hardware processors are configured to perform an automated process comprising:
- (a) performing a deterministic rule-based search, in a plurality of stored documents, for Personally Identifiable Information (PII) data-items; and
- (b) responsive to the deterministic rule-based search indicating that a particular document is more likely than not to contain a PII data-items,
  - (b1) extracting a textual snippet from said particular document, wherein the textual snippets surrounds said PII data-item, and
  - (b2) adding said textual snippet and said particular document to one or more training datasets utilized for training a Large Language Model (LLM) configured to find PII data-items in documents for Named Entity Recognition (NER) in said documents.

\* \* \* \* \*